US 6,686,005 B2

(12) United States Patent
White et al.

(10) Patent No.: US 6,686,005 B2
(45) Date of Patent: Feb. 3, 2004

(54) END TERMINATION MATERIALS FOR RECLOSABLE POLYMERIC BAGS

(75) Inventors: Thomas A. White, Farmington, NY (US); Nathan A. Kolovich, Rochester, NY (US); Edwin Jackson-Kuofie, Parkville, MO (US)

(73) Assignee: Pactiv Corporation, Lake Forest, IL (US)

( * ) Notice: Subject to any disclaimer, the term of this patent is extended or adjusted under 35 U.S.C. 154(b) by 25 days.

(21) Appl. No.: 09/975,613

(22) Filed: Oct. 11, 2001

(65) Prior Publication Data

US 2003/0082319 A1 May 1, 2003

(51) Int. Cl.[7] .................. B65D 33/16; A44B 19/26; A44B 19/30
(52) U.S. Cl. .................. 428/35.2; 428/35.7; 383/64; 383/65; 383/97; 383/63; 24/405; 24/415; 24/433; 24/436; 24/585.12
(58) Field of Search .................. 428/35.2, 35.7; 383/63, 64, 65, 97; 24/405, 415, 585.12, 433, 434, 436

(56) References Cited

U.S. PATENT DOCUMENTS

| | | | |
|---|---|---|---|
| 5,067,208 A | 11/1991 | Herrington, Jr. et al. ..... 24/400 |
| 5,100,721 A | * 3/1992 | Akao .......................... 428/218 |
| 5,110,639 A | * 5/1992 | Akao .......................... 428/35.2 |
| 5,131,121 A | 7/1992 | Herrington, Jr. et al. ..... 24/436 |
| 5,448,807 A | 9/1995 | Herrington, Jr. ............. 24/399 |
| 5,669,715 A | 9/1997 | Dobreski et al. .............. 383/5 |
| 5,769,772 A | 6/1998 | Wiley ......................... 493/189 |
| 5,775,812 A | 7/1998 | St. Phillips et al. ............ 383/5 |
| 5,788,378 A | 8/1998 | Thomas ....................... 383/63 |
| 5,833,791 A | 11/1998 | Bryniarski et al. ..... 156/244.25 |
| 5,851,070 A | 12/1998 | Dobreski et al. .............. 383/63 |
| 5,867,875 A | 2/1999 | Beck et al. .................... 24/400 |
| 5,896,627 A | 4/1999 | Cappel et al. ................ 24/400 |
| 5,911,508 A | 6/1999 | Dobreski et al. .............. 383/5 |
| 5,919,535 A | 7/1999 | Dobreski et al. .......... 428/35.2 |
| 5,964,532 A | 10/1999 | St. Phillips et al. ............ 383/5 |
| 5,981,048 A | * 11/1999 | Sugimoto et al. ........... 428/216 |
| 6,010,244 A | 1/2000 | Dobreski et al. ............. 383/63 |
| 6,286,189 B1 | 9/2001 | Provan et al. ........... 24/30.5 R |
| 6,390,676 B1 | * 5/2002 | Colombo et al. ........... 383/204 |

FOREIGN PATENT DOCUMENTS

| | | | |
|---|---|---|---|
| EP | 0 582 044 A1 | 2/1994 | ............ G03C/3/00 |
| WO | WO 95/35048 | 12/1995 | ............ A44B/19/00 |
| WO | WO 97/19582 A2 A3 | 6/1997 | .............. C08J/3/12 |
| WO | WO 98/06292 A1 | 2/1998 | ........... A44B/19/36 |
| WO | WO 98/21274 A1 | 5/1998 | ............ C08L/23/04 |
| WO | WO 02/14161 A2 A3 | 2/2002 | |
| WO | WO 02/064674 A2 A3 | 8/2002 | ............ C08L/23/02 |

OTHER PUBLICATIONS

European Search Report for European Application No. EP 02 02 2924 (Jan. 22, 2003).
Földes, Enikó, *Physical Aspects Of Polymer Stabilization*, Macromolecular Symposia, vol. 100, pp. 77–80 (1995).
Haruna, T., *Aspects Of Stabilization With Phosphorous Antioxidants In Polymers*, Applied Macromolecular Chemistry And Physics, vol. 232, pp. 119–131 (1995).

* cited by examiner

*Primary Examiner*—Harold Pyon
*Assistant Examiner*—Chris Bruenjes
(74) *Attorney, Agent, or Firm*—Jenkens & Gilchrist

(57) ABSTRACT

An end termination for use with a reclosable polymeric bag comprises providing a mixture comprising from about 70 to about 95 wt. % of a polyolefin, from about 5 to about 25 wt. % hydrocarbon, from about 0.01 to about 2 wt. % mold release agent, from about 0.1 to about 1 wt. % primary antioxidant, and at least about 0.06 wt. % secondary antioxidant.

14 Claims, 3 Drawing Sheets

END TERMINATION MATERIALS FOR RECLOSABLE POLYMERIC BAGS

FIELD OF THE INVENTION

The present invention generally relates to reclosable polymeric bags and, more particularly, to a reclosable polymeric bag having end terminations.

BACKGROUND OF THE INVENTION

A reclosable polymeric bag typically includes first and second opposing panels fixedly connected to each other along a pair of sides and a bottom bridging the pair of sides. The first and second panels are not fixedly connected along a mouth which is formed opposite to the sealed or folded bottom. Rather, the bag is provided with a reclosable zipper extending along the mouth of the polymeric bag. The zipper includes a male track and a female track. In reclosable polymeric bags of the type disclosed in U.S. Pat. No. 5,067,208 utilizing a slider to open the zipper, the male track typically includes a male profile and a first fin extending downward from the male profile. Likewise, the female track in such bags with sliders includes a female profile and a second fin extending downward from the female profile. The first and second fins are thermally fused to the inner surfaces of the respective first and second panels.

The male and female profiles are releasably engageable to each other. When the slider is in a closed position, the male and female profiles are interlocked with each other. In response to moving the slider to an open position, the male and female profiles are disengaged from each other. Once the male and female profiles are disengaged from each other, access to the interior of the bag may be obtained by pulling the first and second panels apart at the mouth.

Opposite ends of the zipper are typically provided with end terminations. The end terminations may perform numerous functions, such as (a) preventing or inhibiting the slider from going past the ends of the fastener, (b) interacting with the slider to give a tactile indication of being closed, (c) assisting in inhibiting or preventing leakage from the bag, and (d) holding the fastener together and providing additional strength in resisting stresses to the bag.

In some applications, each end termination is in the form of a strap/clip that wraps over the top of the zipper One end of the strap is provided with a rivet-like member that penetrates through the zipper fins and into a cooperating opening at the other end of the strap.

One of the major drawbacks of these and other existing end terminations is the production time, as compared to production times of other steps in the manufacturing process. Since the end terminations are only one step in forming the polymeric bags, it is important that the production time of the end terminations be in concert with the other steps. Another drawback experienced by some end terminations is found when the end termination is removed from the mold. In some end terminations, "stringers," or threads of the mixture, do not completely break free from the mold and cause problems in the production process. Another drawback of present end terminations is that the strap is a separate part that must be attached to the zipper. This creates another step in the manufacturing process. Also, since the strap has to be manufactured separately, it is often more expensive than is desirable.

SUMMARY OF THE INVENTION

The present invention is a process for preparing an end termination for use with a reclosable polymeric bag. First, a mixture is provided that comprises from about 70 to about 95 wt. % of a polyolefin, from about 5 to about 25 wt. % hydrocarbon, from about 0.01 to about 2 wt. % mold release agent, from about 0.01 to about 0.3 wt. % primary antioxidant, and at least about 0.03 wt. % secondary antioxidant. Next, the mixture is heated approximately to its appropriate application temperature and the melted mixture is injected into a mold. After the mixture is cooled to form the end termination, the end termination is ejected from the mold.

The above summary of the present invention is not intended to represent each embodiment or every aspect of the present invention. This is the purpose of the Figures and the detailed description which follow.

BRIEF DESCRIPTION OF THE DRAWINGS

The foregoing and other advantages of the invention will become apparent upon reading the following detailed description and upon reference to the drawings.

Figure 1:
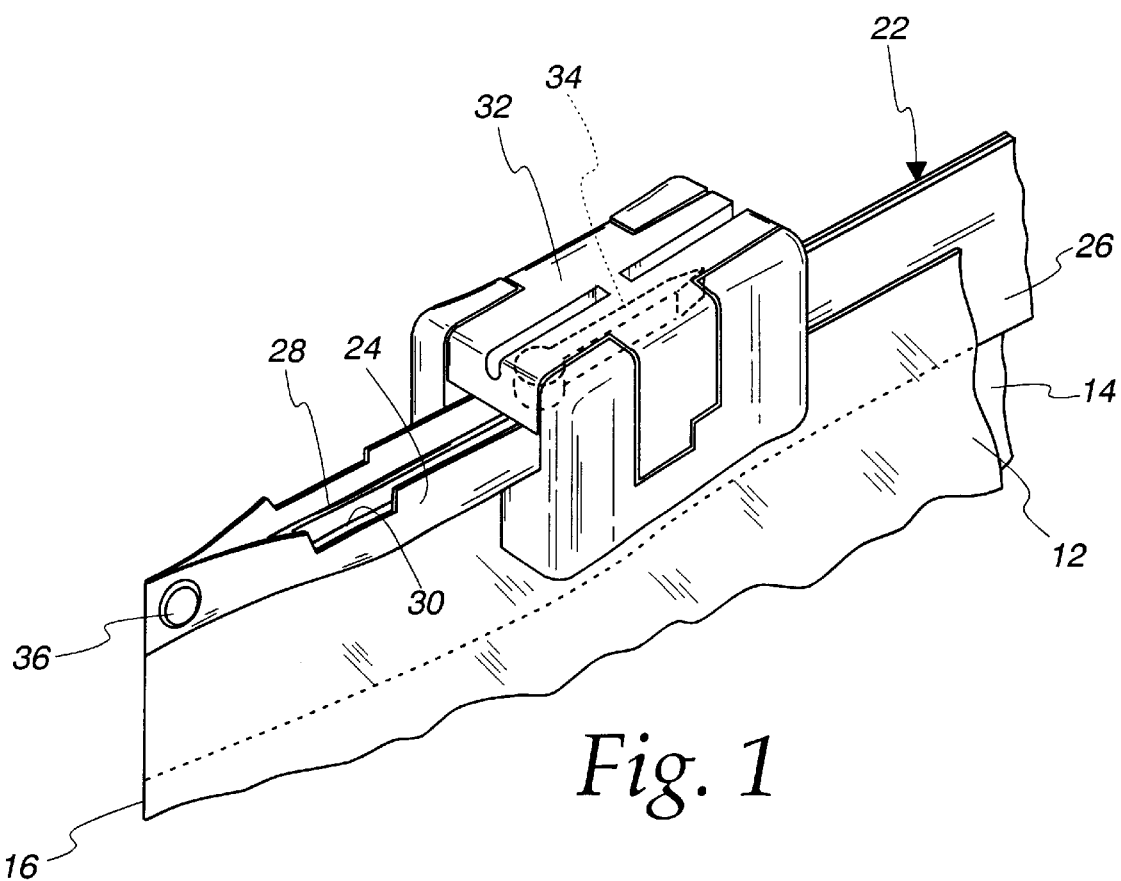
FIG. 1 is an isometric view of a mouth portion of a reclosable polymeric bag having an end termination according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 2:
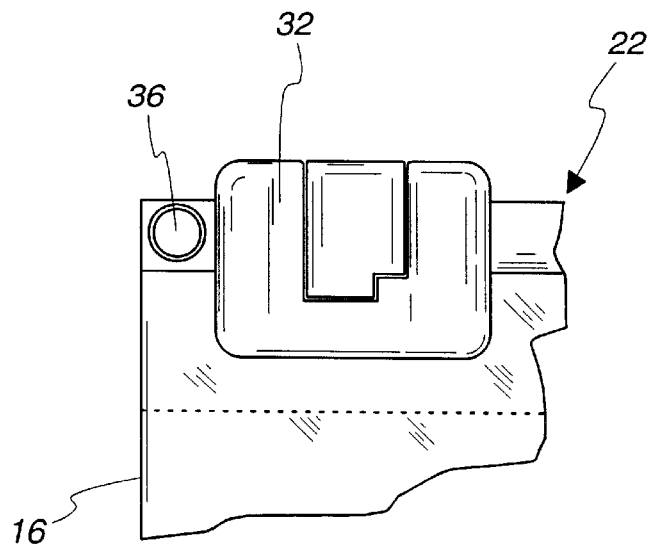
FIG. 2 is a front view of the bag mouth portion in FIG. 1, depicting a slider in a closed position.

Turning now to the drawings, FIGS. 1 and 2 depict a mouth portion of a reclosable polymeric bag according to one embodiment of the present invention. The polymeric bag comprises first and second opposing panels 12, 14 fixedly connected to each other along a pair of sides 16 (only one shown in FIGS. 1 and 2) and a folded bottom bridging the pair of sides 16. In some embodiments, the pair of sides are merely sealed together at the bottom, and a separate bottom bridging the pair of sides 16 is not included. The bag is provided with a reclosable zipper or fastener 22 extending along the mouth portion, which is formed opposite the sealed or folded bottom of the polymeric bag.

The zipper 22 includes a male track and a female track. The male track includes a male profile 24 and a first depending fin or flange 26 extending downward from the male profile 24. Likewise, the female track includes a female profile 28 and a second depending fin or flange 30 extending downward from the female profile 28. If the zipper 22 is formed separately from the panels 12, 14 of the bag, the first and second fins 26, 30 are thermally fused to inner surfaces of the respective first and second panels 12, 14. Alternatively, the zipper 22 may be integrally formed with the panels 12, 14 such that the first fin 26 is integrally formed with the first panel 12 and the second fin 30 is integrally formed with the second panel 14.

To assist in opening the polymeric bag, a slider 32 is slidably mounted to the zipper 22 for movement between a closed position and an open position. In the closed position of the slider 32 shown in FIG. 2, the male and female profiles 24, 28 are interlocked with each other. Movement of the slider 32 from the closed position in FIG. 2 towards the open position (see FIG. 1) disengages the male and female profiles 24, 28 from each other and allows a user to gain access to the interior of the polymeric bag. The slider 32 includes a separator finger 34 (FIG. 1) for disengaging the male and female profiles 24, 28 from each other. Further details concerning the construction and operation of the zipper 22 and the slider 32 may be obtained from U.S. Pat. No. 5,067,208 to Herrington, Jr., et al., which is incorporated herein in its entirety by reference.

In some embodiments, the slider 32 may not be included, and the male and female profiles 24, 28 may be interlocked by pressing the male and female profiles 24, 28 into each other. To open the bag, the male and female profiles 24, 28 may be pulled apart.

To prevent or inhibit the slider 32 from going past the ends of the zipper 22 and to provide adequate end strength that resists stresses applied to the profiles 24, 28 during normal use of the bag, end terminations 36 are located at or near the ends of the zipper 22. Only one end termination 36 is depicted in FIG. 2, but a corresponding end termination (not shown) is typically located at an opposing side of the bag.

Figure 3:
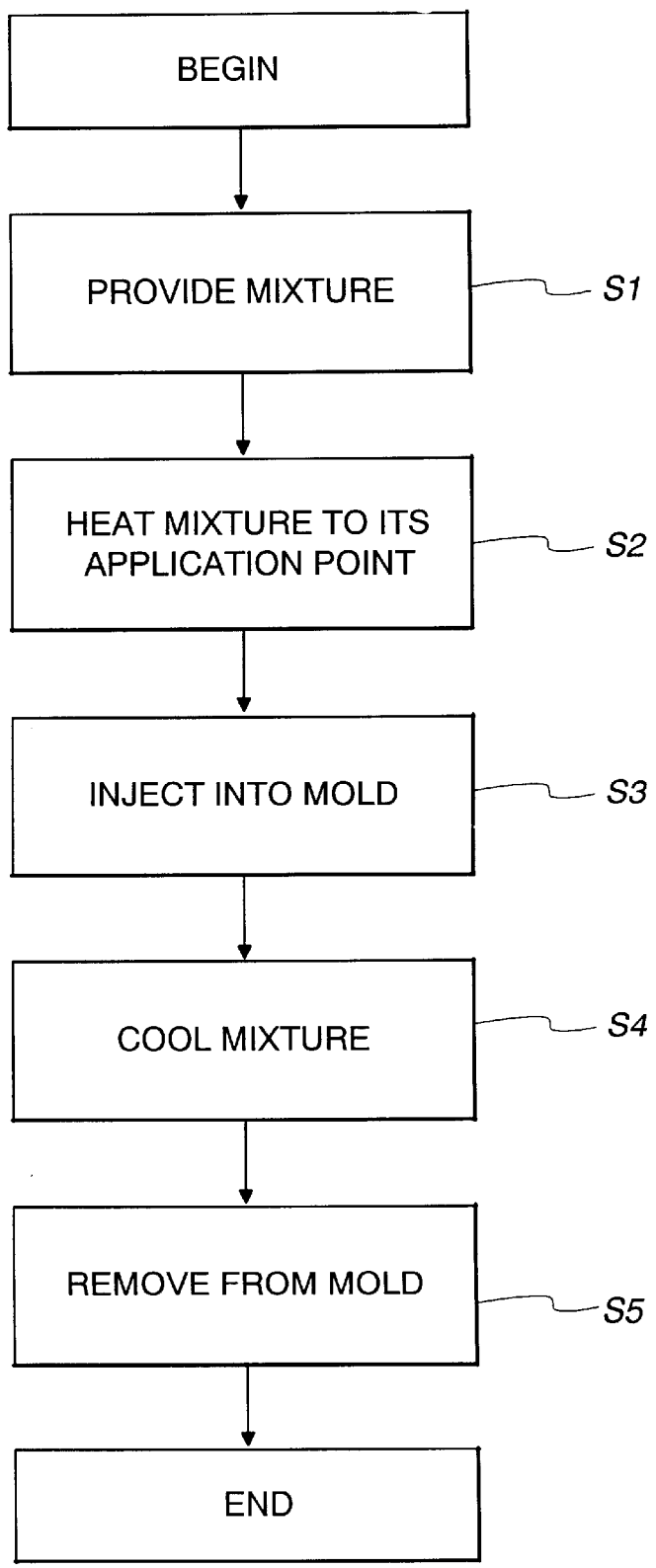
FIG. 3 is a flowchart illustrating a method of making an end termination according to one embodiment of the present invention.

Turning now to FIG. 3, a flowchart is depicted that describes a formation of an end termination 36 according to one process of the present invention. As shown in step S1, a polymeric mixture generally comprises from about 70 to about 95 wt. % of a polyolefin, from about 5 to about 25 wt. % hydrocarbon, from 0 to about 3 wt. % optional whitener such as titanium dioxide ($TiO_2$), from about 0.01 to about 2 wt. % mold release agent, from about 0.01 to about 0.3 wt. % primary antioxidant, and at least about 0.03 wt. % secondary antioxidant. In another embodiment, the mixture comprises from about 80 to about 95 wt. % polyolefin, from about 8 to about 15 wt. % hydrocarbon, from about 0.15 to about 1 wt. % whitener, from about 0.15 to about 1 wt. % mold release agent, from about 0.1 to about 0.5 wt. % primary antioxidant, and from about 0.06 to about 0.1 wt. % secondary antioxidant.

A polyolefin that may be used in the formation of the end termination 36 is a polymer based on olefin monomers such as polyethylenes and polypropylenes. Some of the polyolefins contemplated for use in the present invention include low density polyethylenes and ethylene vinyl acetates.

An example of a hydrogenated hydrocarbon that may be used in the formation of the end termination 36 is REGELITE V-1100®, manufactured by Eastman Chemical Co. of Kingsport, Tenn. It is contemplated that other hydrocarbons may be used, such as partially hydrogenated hydrocarbon such as EASTOTAC H100R®, manufactured by Eastman Chemical Co. of Kingsport, Tenn. It is important that the hydrocarbon have similar general properties as the polyolefin. For example, the hydrocarbon preferably should have a melting point that is compatible with the polyolefin used (e.g., a melting point of from about 200 to about 300° F.). The hydrocarbon preferably should be adapted to bond well to the polyolefin. It is contemplated that other hydrocarbons having properties similar to the mixture may also be used in the present invention.

The purpose of the hydrocarbon is to act as a tackifier. A tackifier helps hold all of the compounds together in a mixture, it helps the material bond to the male and female profiles, and helps generally in the mixture's adhesion to surfaces. The hydrocarbon also gives the mixture more time to adhere to the profiles. Once an adhesive mixture is injected onto something, it only has a certain amount of time in which its adhesive properties will still work. This is known as the open time. The hydrocarbon increases the open time, giving the mixture a longer time to adhere to the profiles after being injected. Furthermore, the hydrocarbon also aids in maintaining clarity of the mixture and in keeping the white pigment well mixed throughout the mixture, creating a more even color throughout the mixture.

A mold release agent is generally defined as a lubricant that enables a mixture to be cleanly expelled from a mold. Internal mold release agents are added to the mixture to generally improve resin flow, improve the dispersion of additives and the wetting of reinforcements, and improve the aesthetics of molded parts. In one embodiment, the mold release agent has a drop melt point, as defined by ASTM-127, from about 170 to about 210° F., a vapor density of less than 1 $g/cm^3$, and a specific gravity at 203° F. of 0.810. One example of a commercially available mold release agent that may work with several polyolefin mixtures is MOLD WIZ # INT-33PA®, manufactured by Axel Corporation of Woodside, N.Y. It is contemplated that other mold release agents may also be used in the present invention.

An antioxidant may include any of various organic compounds that are added to materials, such as paints, plastics, gasoline, rubber, and food products, to reduce the effect of oxidation and the accompanying degradation of properties. In polymers, degradation can be caused by mechanical shearing in an extruder, temperature, and attack by certain metal ions. All of these causes of degradation form highly reactive free radicals. In the presence of oxygen, these free radicals can initiate oxidative degradation and an auto-accelerated free radical chain reaction. This can lead to chain scission (reduction of molecular lengths), cross-linking (gel formation), and discoloration of the polymer. Primary antioxidants of the present invention inhibit radical formation and propagation and improve color stability. Primary antioxidants react with some types of free radicals (e.g., peroxy and alkoxy radicals) to stop further degradation reactions. Primary antioxidants also improve color stability of the mixture. One example of a primary antioxidant is pentaerythritol tetrakis (3-(3,5-di-tert-butyl-4-hydroxyphenyl) propionate), also known by its trade name, IRGANOX 1010®, manufactured by Ciba Spezialitatenschemi AG of Basel, Switzerland. Another primary antioxidant that may be used is Octadecyl 3-(3,5-di-tert-butyl-4 hydroxphenyl) propionate, also known by its trade name, IRGANOX 1076®, manufactured by Ciba Spezialitatenschemi AG of Basel, Switzerland. A third example of a primary antioxidant that may be used is 1,3,5-tris(3,5-di-tert-butyl-4-hydroxybenzyl)-1,3,5-triazine-2,4,6(1H, 3H, 5H)trione, also known by its trade name, BNX 3114®, manufactured by Mayzo of Norcross, Ga. The primary antioxidant preferably has a melting point of from about 200 to about 440° F., so as to be within the general operating temperatures of the machines used in the bag making process. The primary antioxidant may also have a density of from about 1.011 to 1.30 g/cm$^3$ at a temperature of 77° F.

A secondary antioxidant of the present invention reacts with hyperoxides and interferes with reaction initiation steps by retarding the formation of free radicals. An example of a secondary antioxidant is bis(2,4-di-t-butylphenyl) pentaerythritol diphosphite, also known by its tradename, ULTRANOX 626®, manufactured by GE Specialty Chemicals of Morgantown, W. Va. Another example of a secondary antioxidant is Tris(nonylphenyl) phosphite, also known by trade names, IRGAFOS TNPP®, manufactured by Ciba Spezialitatenschemi AG of Basel, Switzerland, and WESTON 399® or WESTON TNPP®, both manufactured by GE Specialty Chemicals of Morgantown, W. Va.

The secondary antioxidant preferably has a melting point of from about 300 to about 400° F., so as to be within the general operating temperatures of the machines used in the bag making process. The secondary antioxidant may also have a vapor pressure of from about 3 to about 7 mmHg at 410° F. and a vapor density of from about 15 to about 25 (as compared to air=1). Both the primary and the secondary antioxidants are chosen based on the ability to maintain the color of the end termination material over time.

In one embodiment, a whitener, such as titanium dioxide (TiO$_2$), may be added to enhance the whiteness of the end termination. A whitener may be added if it is determined to be more aesthetically pleasing as compared to a different colored end termination. In other embodiments, other pigments may be added to create end terminations of different colors, or no pigment may be added and the color of the mixture would not be changed.

In step S2, the above-described mixture is then heated approximately to its appropriate application temperature, typically from about 340 to about 375° F. When the mixture reaches about 350° F., the mixture generally has a viscosity of at least 9,500 centipoise (cps). In one embodiment, the viscosity of the mixture is in the range of about 20,000 to about 30,000 cps, preferably from about 22,000 to about 27,000 cps.

Once the mixture is sufficiently softened or melted, it is then injected into the mold (step S3). The mold is placed on the zipper itself so that the mixture is added directly to the male and female profiles. In one embodiment of the present invention, a reciprocating screw-type injection molding machine is used in step S3. The reciprocating screw-type injection molding machine has a cavity, a rotating screw at one end of the cavity, and an opening at the opposing end. The rotating screw moves in a first direction in response to increased pressure in the cavity. As the screw moves in the first direction, the mixture is then drawn into the cavity of the injection molding machine. Once the mixture is in the cavity, the screw is then moved in a second direction generally opposite to the first direction, resulting in ejection of the mixture from the injection molding machine and into a mold of the desired end termination shape. A detailed description of injection molding may be found, for example, in chapter five of the *SPI Plastics Engineering Handbook*, Fifth Edition, edited by Michael L. Berins (1991).

Figure 4:
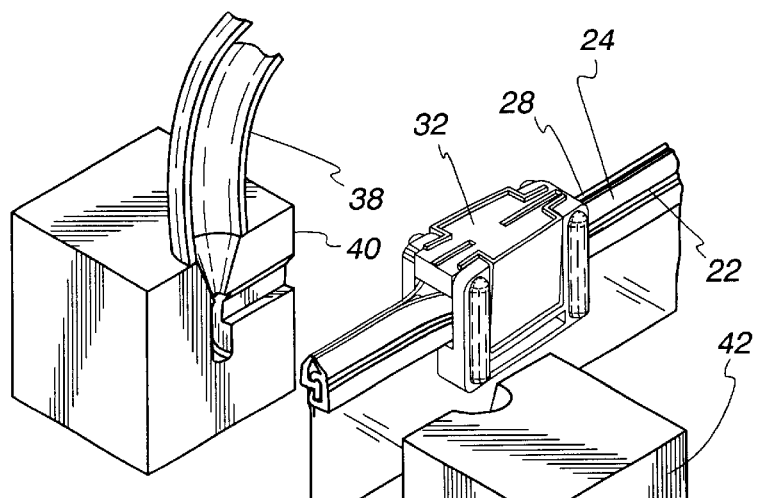
FIG. 4 is an enlarged isometric view of the end of the fastener showing a pair of reciprocating molds in an open position.
Figure 5:
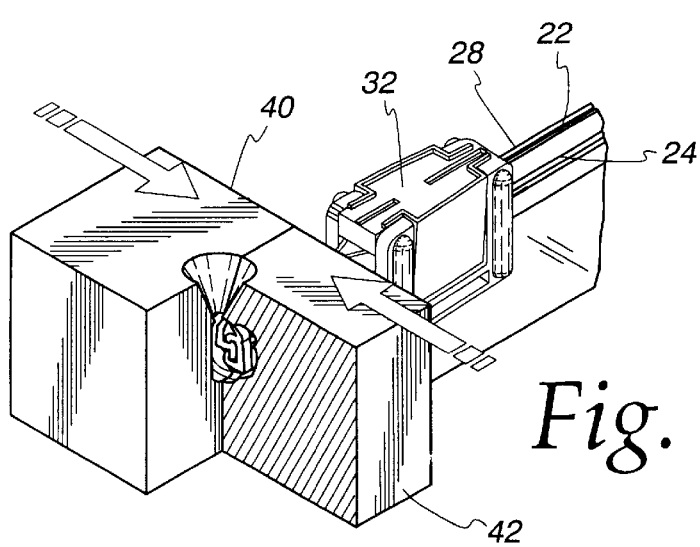
FIG. 5 is an enlarged isometric view of the end of the fastener showing the pair of molds in a closed position while forming the end stop.
Figure 6:
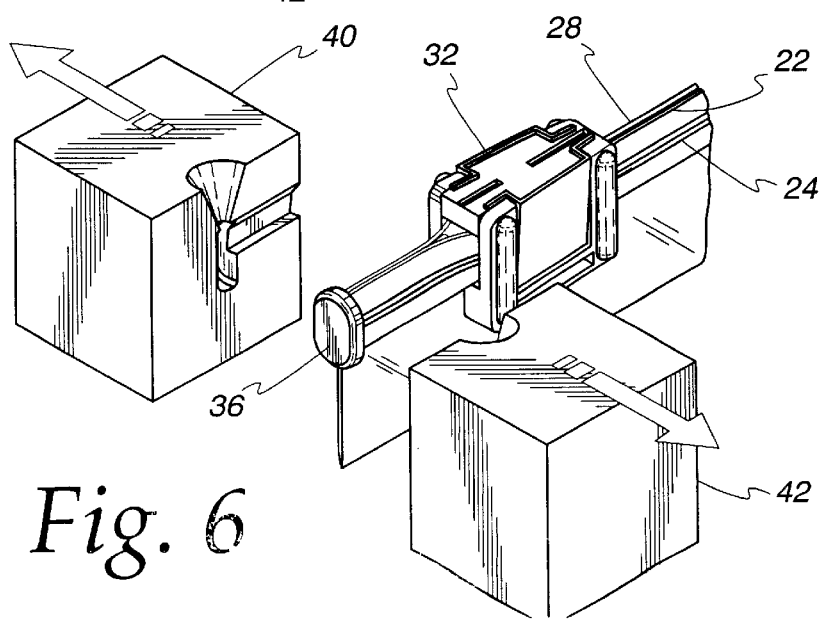
FIG. 6 is an enlarged isometric view of the end of the fastener showing the pair of molds returned to the open position after forming the end stop.

In another embodiment shown in FIGS. 4–6, a hot melt application system is used to feed the hot melt to a nozzle 38, which injects the melt into molds 40, 42 to make the end terminations 36. The molds 40, 42 are located at either side of the zipper 22. As shown in FIG. 5, the molds 40, 42 close over the zipper 22 and the end termination 36 is formed directly onto the zipper 22. The hot melt is fed into the molds 40, 42 at this stage. The hot melt reservoir is generally maintained at temperatures less than approximately 340° F. to eliminate yellowing of the mixture. The nozzle 38, however, is generally maintained at temperatures greater than approximately 365° F. to increase the adhesion properties of the melted end terminations to the polymeric bag. To assist in ensuring that the mixture meets the temperature requirements of both the reservoir and the nozzle 38, a hose (not shown) connects the reservoir to the nozzle 38. The hose may be about 8 to 15 feet in length, and is generally kept at temperatures between about 350 to about 380° F.

To form the end terminations 36 in their desired shape, the mixture is cooled while in the mold in step S4 of FIG. 3. The molds 40, 42 are kept closed in the position shown in FIG. 5. This is done whether a hot melt application system or other typical injection molding device is used. During cooling, the mixture hardens into its desired shape. The cooling time for the end terminations 36 of the present invention varies depending on the mixture and machinery used. The cooling time of the end terminations 36 is generally under 1 second. Typical machinery used to form polymeric bags have cycle times of between 40 to 120 cycles per minute. Thus, to keep the production line moving smoothly, the mixture must be inserted into the molds 40, 42 and cooled within about 1 second. Preferably, the mixture can be inserted and cooled between about 250 and 700 ms. Once the mixture is done cooling, the molds 40, 42 are then opened as shown in FIG. 6, and the end termination 36 is formed as shown. In some embodiments, there may be two pairs of molds 40, 42, with one pair of molds 40, 42 making a leading end termination for one zipper and the other pair of molds 40, 42 making a trailing end termination for another zipper at the same time. This also reduces the production time.

When the mixture is removed from the mold (step S5), it is preferable that the solidified end termination make a clean break from the mold, i.e., no "stringers." The presence of stringers may result in the need to slow down the machine. Stringers may also cause the machine to jam and require the machine to be cleaned more often. It may also result in an end termination that is not of the aesthetic or functional quality desired by the consumer. The present mixture, therefore, preferably breaks cleanly from the mold without stringers.

Another desirable property of the mixture is that it passes the ball and ring test at approximately 220° F., as defined by ASTM D 445. The ball and ring test measures the kinematic viscosity of the mixture.

EXAMPLES

The following examples are presented to demonstrate the testing of the oxidizing properties of various mixtures, the pull-off force of various mixtures, and other desired properties of the mixture.

In Table 1, Examples 1–42 are shown that vary in weight percent and the type of the secondary antioxidant used. The mixture comprised from 0 to about 0.3 wt. % of the secondary antioxidant. Various secondary antioxidants were used in Examples 1–40 including: WESTON 399, manufactured by G. E. Specialty Chemicals of Parkersburg, W. Va.; ULTRANOX 626®; IRGAFOS 168®, manufactured by Ciba-Geigy of Hawthorne, N.Y.; SANTONOX®, manufactured by Monsanto of St. Louis, Mo.; and WESTON 3114®, manufactured by G E Specialty Chemicals of Parkersburg, W. Va. Examples 41 and 42 used a primary antioxidant, IRGANOX 1076®, manufactured by Ciba Spezialitatenschemi AG of Basel, Switzerland, in order to check whether a secondary antioxidant was really needed or whether two primary antioxidants could be used instead.

The aged color test examines the "L value," or the whiteness of the mixture, after the antioxidants are added to the mixture and the "b value," or the yellowness of the mixture. Both the L value and the b value are tested by placing a sample of the mixture in a calorimeter and reading the displayed L and b values. The colorimeter used in this test was manufactured by Hunter Associates Laboratory, Inc., of Reston, Va. The samples were measured once prior to aging, put in an oven at 350° F. in an air atmosphere for 7 hours and then measured again to reveal any color degradation that may have occurred.

In interpreting the L values, the higher the L value, the whiter the mixture. At the start of the testing, the L value is preferably above about 80. After 7 hours, a "white" mixture with an L value closest to that of the original L value is preferred. The more the L value after 7 hours differs from the L value at the start time, the less preferable the mixture.

The interpretation of the b value tests performed in a manner opposite to the L value test. Specifically, the greater the b value, the more yellow a mixture. The b value is tested after the mixture is combined and again after 7 hours. An acceptable b value is under about 3 at time zero and under about 8 after 7 hours of thermal aging at 350° F.

TABLE 1

| | | | | Aged Color Test | | | |
| | | | | L Value (White)[2] | | b value (yellow)[3] | |
| Example | Additional 1010% | Secondary AO[1] Type | wt. % | Time 0 | Time 7 Hours | Time 0 | Time 7 Hours |
| --- | --- | --- | --- | --- | --- | --- | --- |
| 1 | 0 | None | 0.0 | 83.3 | 54.6 | 5.6 | 31.3 |
| 2 | 0 | None | 0.0 | 82.9 | 49.8 | 10.8 | 25.5 |
| 3 | 0 | None | 0.0 | 82.3 | 47.7 | 11.0 | 25.5 |
| 4 | 0 | None | 0.0 | 84.9 | 79.2 | 3.2 | 14.8 |
| 5 | 0 | None | 0.0 | 84.1 | 76.9 | 4.9 | 16.9 |
| 6 | 0 | None | 0.0 | 83.8 | 78.8 | 5.5 | 16.3 |
| 7 | 0 | None | 0.0 | 85.7 | 78.6 | 3.9 | 15.9 |
| 8 | 0 | None | 0.0 | 84.2 | 76.8 | 7.3 | 18.3 |
| 9 | 0 | None | 0.0 | 83.1 | 77.0 | 8.0 | 18.5 |
| 10 | 0 | None | 0.0 | 83.1 | 57.2 | 5.4 | 26.9 |
| 11 | 0 | None | 0.0 | 85.4 | 79.3 | 6.2 | 17.0 |
| 12 | 0 | None | 0.0 | 83.0 | 78.4 | 6.7 | 16.8 |
| 13 | 0.2 | 399[5] | 0.3 | 85.3 | 80.0 | 1.4 | 7.5 |
| 14 | 0.2 | 399 | 0.3 | 86.8 | 85.2 | 0.9 | 6.1 |
| 15 | 0.2 | 399 | 0.3 | 86.7 | 83.0 | 1.9 | 7.9 |
| 16 | 0 | 399 | 0.05 | 83.7 | 56.7 | 3.9 | 30.7 |
| 17 | 0.2 | 399 | 0.3 | 86.0 | 83.4 | 3.4 | 8.4 |
| 18 | 0.2 | 399 | 0.3 | 85.9 | 84.0 | 1.8 | 6.2 |
| 19 | 0.2 | 399 | 0.3 | 85.3 | 82.5 | 2.8 | 7.7 |
| 20 | 0.2 | 399 | 0.3 | 84.8 | 82.7 | 2.7 | 7.7 |
| 21 | 0.2 | 399 | 0.3 | 85.2 | 83.4 | 1.4 | 5.4 |
| 22 | 0.2 | 399 | 0.3 | 84.8 | 83.7 | 1.5 | 6.2 |
| 23 | 0 | 399 | 0.2 | 85.3 | 83.1 | 1.6 | 6.2 |
| 24 | 0 | 399 | 0.3 | 84.4 | 83.3 | 1.5 | 5.7 |
| 25 | 0 | 626[6,7] | 0.05 | 83.7 | 56.7 | 3.9 | 30.7 |
| 26 | 0 | 626 | 0.09 | 87.2 | 86.6 | 0.8 | 2.5 |
| 27 | 0 | 626 | 0.2 | 84.7 | 81.9 | 1.4 | 6.0 |
| 28 | 0 | 626 | 0.2 | 83.9 | 80.9 | 2.1 | 7.8 |
| 29 | 0 | 626 | 0.2 | 85.8 | 83.1 | 4.0 | 11.0 |
| 30 | 0 | 626 | 0.2 | 85.8 | 83.7 | 2.6 | 6.7 |
| 31 | 0 | 626 | 0.2 | 84.7 | 84.3 | 1.4 | 4.7 |
| 32 | 0 | 168[8] | 0.05 | 86.0 | 77.2 | 3.7 | 14.7 |
| 33 | 0 | 168 | 0.1 | 84.4 | 61.9 | 2.4 | 29.3 |
| 34 | 0 | 168 | 0.2 | 83.6 | 73.1 | 2.9 | 16.8 |
| 35 | 0 | 168 | 0.2 | 85.0 | 77.9 | 5.5 | 17.8 |
| 36 | 0 | 168 | 0.2 | 85.1 | 82.5 | 2.2 | 7.0 |
| 37 | 0 | 168 | 0.2 | 82.2 | 74.7 | 3.0 | 21.5 |
| 38 | 0 | Santonox[9] | 0.05 | 83.3 | 56.2 | 4.5 | 30.8 |
| 39 | 0 | Santonox | 0.2 | 82.8 | 52.6 | 5.2 | 27.3 |
| 40 | 0 | 3114[10] | 0.2 | 79.7 | 59.6 | 4.4 | 30.5 |
| 41 | 0 | 1076[11] | 0.2 | 85.0 | 79.7 | 4.7 | 15.5 |
| 42 | 0 | 1076 | 0.2 | 79.8 | 65.0 | 8.4 | 29.5 |

[1] AO stands for Antioxidant.
[2] L value: Higher number is whiter.
[3] b value: Higher number is more yellow.
[4] "Additional 1010%" means an addition to the 0.3 wt. % of IRGANOX 1010 ®, manufactured by Ciba Spezialitatenschemi AG of Basel, Switzerland
[5] 399 is WESTON 399 ®, manufactured by G.E. Specialty Chemicals of Parkersburg, West Virginia.
[6] 626 is ULTRANOX 626 ®, manufactured by GE Specialty Chemicals of Morgantown, West Virginia.
[7] Examples 1–24 are from a batch having 0.30 wt. % mold release agent, and Examples 25–42 are from a batch having 0.15 wt. % mold release agent.
[8] 168 is IRGAFOS 168 ®, manufactured by Ciba-Geigy of Hawthrone, New York.
[9] SANTONOX ® is manufactured by Monsanto of St. Louis, Missouri.
[10] 3114 is WESTON 3114 ®, manufactured by GE Specialty Chemicals of Parkersburg, West Virginia
[11] 1076 is IRGANOX 1076 ®, manufactured by Ciba Spezialitatenschemi AG of Basel, Switzerland.

Examples 1–12, 16, 17, 25, 29, 32, 35 and 37–42 all had starting b values that were above the maximum threshold of 3. Examples 1–12, 16, 17, 25, 29, 32–35 and 37–42 had b values after 7 hours that were too high (over 8). Examples 1–12, mixtures without any secondary antioxidants, yielded poor aged color testing results. Examples 32–35 and 37–42 all had L values after 7 hours that were too low, indicating that IRGAFOS 168®, SANTONOX®, and IRGANOX 1076® are unsuitable. Example 36 fell within the acceptable range, however, it is believed to be an outlier, since the other examples with the same compounds fall well outside the stated limitations. Examples 16, 25, 32 and 38 used only 0.05 wt. % of the secondary antioxidant, leading to the conclusion that more than 0.05 wt. % of a secondary antioxidant should be used.

Examples 13–15, 18–24, 26–28, 30 and 31 all had acceptable starting and ending b values. Also, both the starting L values and the L values after 7 hours were acceptable. The L values for each of these Examples had a drop of less than 6 during the first 7 hours. Such low drops in the L value are acceptable for the mixture. Examples 17 and 29 were considered to be outliers since other mixtures having the same composition are acceptable. Thus, Examples 13–15, 17–24 and 26–31 yielded acceptable results for both the L and b values Turning now to Table 2, Examples 43–53 used various types of mold release agents and secondary antioxidants. If the mixture is to come into contact with food products, it presently needs to be approved by the FDA. Examples 43–53 are approved by the FDA at the present time. Second, it is preferable that the mixture meets the aged color testing cited in Table 1. Third, since the mixture is molded in a machine that performs a number of processes, the time of setup for the mold preferably meets the requirements of the machine. In some embodiments, the time limit is within 1 second.

The mixture is tested to see if it sticks to the mold after cooling. This is a simple pass/fail inspection. If, after the predetermined time limit (in this case between about 250 to about 700 ms), the mixture sticks to the mold, it fails. If it is cleanly ejected from the mold, the mixture passes.

When the cooled mixture is removed from the mold, it is undesirable to have "stringers" or threads of the mixture sticking to the mold. Stringers can disrupt the manufacturing process, so it is very important not to have any stringers. The presence of stringers is tested visually. After the end termination is released from the mold, the process can be halted and an operator can look for stringers. The stringer test is a simple pass/fail test. If stringers exist, the mixture fails this test. If there are not any stringers, the mixture passes this test.

Finally, the pull-off force in pounds was measured. The pull-off force is the amount of force required to remove the end termination from the track. Low pull-off force is undesirable because it can cause the slider to be easily removed from the track. The procedure for testing the pull-off force is as follows. A Chatillon gauge (Model # DFGS50) is attached to the slider. The small end of the slider is pulled towards the end termination. The slider is pulled with moderate speed until either the slider comes off over the end termination or the end termination comes off. The Chatillon gauge indicates the peak amount of force. This test is performed 10 times and the results are averaged. The pull-off force preferably is greater than about 8 lbs, but a higher pull-off force is more desirable.

TABLE 2

| Example | 43 | 44 | 45 | 46 | 47 | 48 | 49 | 50 | 51 | 52 | 53 |
|---|---|---|---|---|---|---|---|---|---|---|---|
| Viscosity (cps) @ 350° F. | 9000 | 8000 | | 19500 | 19500 | 19500 | 20800 | 20800 | 24000 | 24000 | |
| Ball and Ring (° F.)[1] | | | | | | | | | 220 | 220 | |
| Include Whitener (TiO$_2$) | Yes | Yes | Yes | Yes | Yes | Yes | Yes | Yes | Yes | Yes | Yes |
| Include Mold Release Agent | ZnSt[7] | ZnSt | ZnSt | ZnSt | ZnSt | WA[8] | No | ZnSt | Axel[9] | Axel[10] | ZnSt |
| Include Primary AO[2] | Yes | Yes | Yes | Yes | Yes | Yes | Yes | Yes | Yes | Yes | Yes |
| Include Secondary AO[3] | No | No | No | No | No | No | No | No | Yes | Yes | No |
| Aged Color Test (Pass/Fail)[4] | Fail | Fail | Fail | Fail | Fail | Fail | Fail | Fail | Pass | Pass | Fail |
| Setup within Time Limits (Yes/No)[5] | No | No | No | No | No | No | Yes | Yes | Yes | Yes | No |
| Mold Sticking (Pass/Fail)[6] | Fail | Fail | Fail | Fail | Fail | Fail | Fail | Fail | Pass | Pass | Fail |

TABLE 2-continued

| Example | 43 | 44 | 45 | 46 | 47 | 48 | 49 | 50 | 51 | 52 | 53 |
|---|---|---|---|---|---|---|---|---|---|---|---|
| Stringers | No | No | No | Yes | Yes | Yes | No | No | No | No | No |
| Pull-off Force, (lbs) | 11.7 | 6.5 |  | 9.7 | 6.5 | 9.5 | 7.9 | 9.6 | 9.9 | 10.4 | 9.1 |

[1]The ball and ring test is defined by ASTM D 445.
[2]The primary antioxidant used in these tests was 0.3 wt. % of IRGANOX 1010 ®, manufactured by Ciba Spezialitatenschemi AG of Basel, Switzerland.
[3]The secondary antioxidant used in these tests was 0.09 wt. % of ULTRANOX 626 ®, manufactured by GE Specialty Chemicals of Morgantown, West Virginia.
[4]The Aged Color Test is defined in Table 1.
[5]In this test, the parameter for the machine was about 700 ms.
[6]The mixture passed the mold sticking test if it was able to be cleanly removed from the mold as tested visually.
[7]ZnSt represents 0.03 wt. % of the mold release agent Zinc Stearate, manufactured by Ferro of Cleveland, Ohio.
[8]WA represents 0.03 wt. % of the mold release agent KEMAMID W20 ®, manufactured by Witco of Greenwich, Conneticut.
[9]Axel represents 0.30 wt. % mold release agent MOLD WIZ # INT-33PA ®, manufactured by Axel Corporation of Woodside, New York.
[10]Axel represents 0.15 wt. % mold release agent MOLD WIZ # INT-33PA ®, manufactured by Axel Corporation of Woodside, New York.

Examples 43–50 and 53 failed the aged color test, as that test is defined in Table 1. Examples 43–48 and 53 failed the time set up test. These examples were not able to be injected and cooled within the 700 ms time frame allotted for the machine.

Examples 43–50 and 53 also failed the mold sticking test, meaning that some of the mixture stuck to the mold when it should have been expelled. Stringers were detected in Examples 46, 47, and 48, and the pull-off force was unacceptable for Examples 44 and 47. The only examples to pass all of the tests were Examples 51 and 52. Example 51 used 0.30 wt. % of MOLD WIZ # INT-33PA® and Example 52 used 0.15 wt. % of MOLD WIZ # INT-33PA®. These tests also indicate that it is important to use a secondary antioxidant, such as Ultranox 626®.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An end termination placed at opposing ends of a bag including a slider, the end termination inhibiting the slider from being removed from the bag, the end termination comprising a mixture comprising from about 70 to about 95 wt. % of a polyolefin, from about 5 to about 25 wt. % hydrocarbon, from about 0.01 to about 2 wt. % mold release agent, from about 0.01 to about 0.3 wt. % primary antioxidant, and at least about 0.03 wt. % secondary antioxidant wherein the mixture at 350° F. has a viscosity from about 9500 to about 30,000 cps.

2. The end termination according to claim 1, wherein the polyolefin is polyethylene, polypropylene, or combinations thereof.

3. The end termination according to claim 1, wherein the polyolefin is low density polyethylene, ethyl vinyl acetate, or combinations thereof.

4. The end termination according to claim 1, wherein each of the mold release agent, the hydrocarbon, and the primary and secondary antioxidants have a melting point between about 200 to about 440° F.

5. The end termination according to claim 1, wherein the primary antioxidant is pentaerythritol tetrakis (3-(3,5-di-tert-butyl-4-hydroxyphenyl)propionate or octadecyl 3-(3,5-di-tert-butyl-4-hydroxphenyl)propionate.

6. The end termination according to claim 1, wherein the secondary antioxidant is bis(2,4-di-t-butylphenyl) pentaerythritol diphosphite or tris(nonylphenyl)phosphite.

7. The end termination according to claim 1, wherein the mixture at 350° F. has a viscosity from about 20,000 to about 30,000 cps.

8. The end termination according to claim 1, wherein the mixture at 220° F. meets the requirements of the ball and ring test as determined by ASTM D 445.

9. The end termination according to claim 1, wherein the mixture further comprises from about 0.3 to about 3 wt. % whitener.

10. The end termination according to claim 1, wherein the whitener is titanium dioxide.

11. The end termination according to claim 1, wherein the mixture is comprised of from about 80 to about 95 wt. % polyolefin, from about 8 to about 15 wt. % hydrocarbon, from about 0.15 to about 1 wt. % whitener, from about 0.15 to about 1 wt. % mold release agent, from about 0.1 to about 0.3 wt. % primary antioxidant, and from about 0.06 to about 0.1 wt. % secondary antioxidant.

12. In a reclosable polymeric bag including first and second opposing panels fixedly connected to each other along a pair of sides and a bottom bridging the pair of sides, a reclosable zipper extending along a mouth formed opposite said bottom, said zipper including a first track with a first profile and a second track with a second profile, said first and second profiles being releasably engageable to each other; and a slider slidably mounted to said zipper for movement between a closed position and an open position, said first and second profiles profiles being engaged to each other while said slider is in said closed position, said first and second profiles being desengaged from each other in repsonse to movement of said slider from said closed position to said open position, at least one end termination comprising from about 70 to about 95 wt. % of a polyolefin, from about 5 to about 25 wt. % hydrocarbon, from about 0.15 to about 3 wt. % whitener, from about 0.01 to about 2 wt. % mold release agent, from about 0.01 to about 0.3 wt. % primary antioxidant, and at least about 0.03 wt. % secondary antioxidant wherein the mixture at 350° has a viscosity from about 9500 to about 30,000 cps.

13. An end termination placed at opposing ends of a bag including a slider, the end termination inhibiting the slider from being removed from the bag, the end termination comprising a mixture comprising from about 70 to about 95 wt. % of a low density polyethylene, from about 5 to about 25 wt. % hydrocarbon, from about 0.01 to about 2 wt. % mold release agent, from about 0.15 to about 3 wt. % whitener, from about 0.01 to about 0.3 wt. % primary antioxidant, and at least about 0.03 wt. % secondary antioxidant, wherein the mixture at 350° F. has a viscosity from about 20,000 to about 30,000 cps, and wherein the mixture at 220° F. meets the requirements of the ball and ring test as determined by ASTM D 445.

14. A package filled with content, comprising opposing body panels attached at edges, a reclosable zipper extending along a mouth formed opposite said bottom, said zipper including a first track with a first profile and a second track with a second profile, said first and second profiles being releasably engageable to each other; and a slider slidably mounted to said zipper for movement between a closed position and an open position, said first and second profiles being engaged to each other while said slider is in said closed position, said first and second profiles being disengaged from each other in response to movement of said slider from said closed position to said open position, at least one end termination comprising from about 70 to about 95 wt. % of a polyolefin, from about 5 to about 25 wt. % hydrocarbon, from about 0.01 to about 2 wt. % mold release agent, from about 0.01 to about 0.3 wt. % primary antioxidant, and at least about 0.03 wt. % secondary antioxidant wherein the mixture at 350° has a viscosity from about 9500 to about 30,000 cps.

* * * * *

UNITED STATES PATENT AND TRADEMARK OFFICE
CERTIFICATE OF CORRECTION

PATENT NO. : 6,686,005 B2
DATED : February 3, 2004
INVENTOR(S) : White et al.

It is certified that error appears in the above-identified patent and that said Letters Patent is hereby corrected as shown below:

Column 12,
Line 51, after "profiles" delete "profiles"
Line 53, delete "desengaged" and insert -- disengaged --
Line 53, delete "repsonse" and insert -- response --
Line 55, after "termination" insert -- placed at an opposing end of a bag including a slider, the end termination inhibiting the slider from being removed from the bag, the end termination --
Line 62, delete "eps" and insert -- cps --

Column 14,
Line 6, after "termination" insert -- placed at an opposing end of a bag including a slider, the end termination inhibiting the slider from being removed from the bag, the end termination --

Signed and Sealed this

Eighth Day of June, 2004

JON W. DUDAS
*Acting Director of the United States Patent and Trademark Office*